May 16, 1950
T. O. DICKENSHEETS
2,508,104
NOVELTY CANE
Filed Jan. 26, 1946
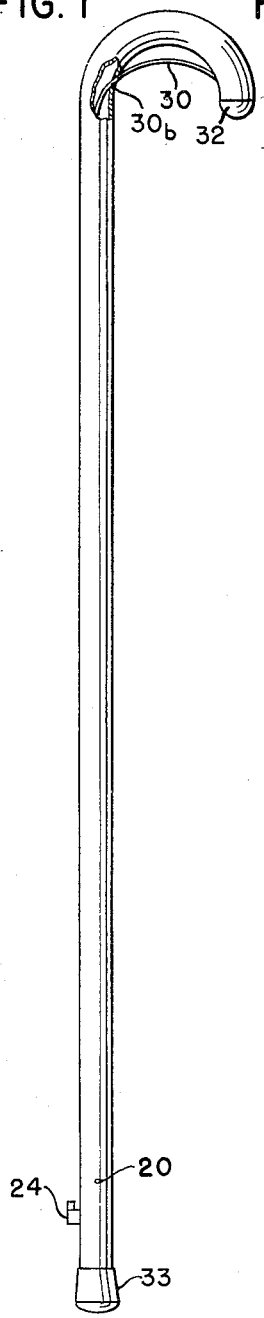
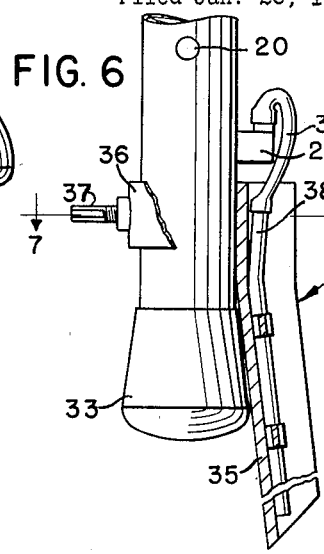
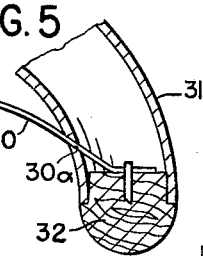
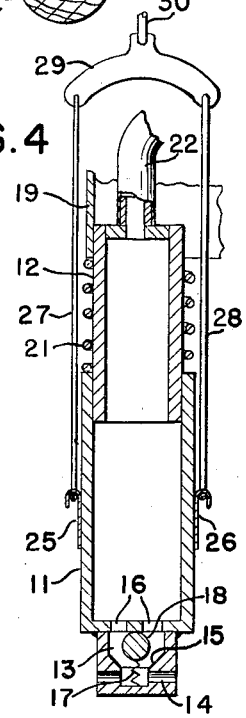
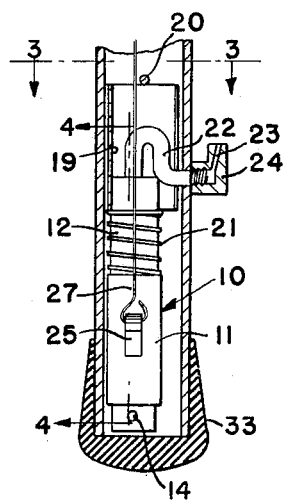
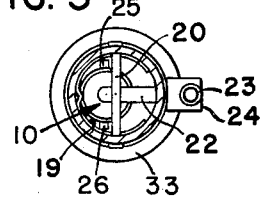
INVENTOR
TULLIE O. DICKENSHEETS
BY
Toulmin & Toulmin
ATTORNEYS Patented May 16, 1950

2,508,104

UNITED STATES PATENT OFFICE 2,508,104

NOVELTY CANE

Tullie O. Dickensheets, Dayton, Ohio

Application January 26, 1946, Serial No. 643,729

3 Claims. (Cl. 135—47)

The present invention relates to canes and, more particularly, to multi-purpose walking sticks.

It is an object of this invention to provide a cane which may be used not only as a walking stick but also for entertaining purposes at occasions such as conventions, carnivals etc.

It is also an object of the invention to provide a cane which in addition to its employment as a walking stick, may be used as a sprayer.

It is a further object of the invention to provide a cane of the above mentioned type which will be adapted to receive and hold a maximum quantity of liquid.

Still another object of the invention consists in the provision of a walking stick which may also be used for spraying an insecticide or other liquid on plants to respectively protect against or, when dealing with weeds, to kill the same.

It is a further object of the invention to provide a cane which may be easily provided with means for channeling the soil so as to make it easier for liquid to reach the roots of weeds to be eliminated.

These and other objects and advantages of the invention will appear more clearly from the following specification in connection with the accompanying drawings, in which:

Figure 1 shows a general view of the cane according to the invention.

Figure 2 is a section through the lower portion of the cane, however, on a larger scale than that shown of Figure 1 and turned around by 180°.

Figure 3 is a section along the line 3—3 of Figure 2.

Figure 4 shows a section along the line 4—4 of Figure 2, however, on a larger scale than the latter.

Figure 5 is an enlarged section through a part of the handle of the cane of Figure 1.

Figure 6 shows, partly in section, an attachment to the cane for facilitating the treatment of weeds or the like.

Figure 7 is a section on line 7—7 of Figure 6.

Referring first to Figures 1 to 5, the cane according to the invention has in general the outer appearance of an ordinary walking stick. The cane is hollow and has provided at its lower portion a small pump generally designated 10. This pump consists primarily of a movable cylinder 11 and a stationary plunger 12. Connected to the cylinder 11 is a check valve 13 having two bores 14 therein. The bores 14 are normally in communication with the interior of the cylinder 11 through the valve seat 15 and through openings 16. This communication is effected by a spring 17 which continually urges the ball 18 away from the valve seat 15. However, when a certain pressure develops in the cylinder 11, the pressure will force the ball 18 upon the valve seat 15 thereby preventing communication between the bores 14 and the interior of the cylinder 11.

The plunger 12 is fastened to a cylindrical spring 19 in any convenient manner, for instance by welding or by depressing a portion of the spring into portions of the plunger wall. The spring 19 is prevented by a pin 20 from moving upwardly in the cane and is pressed against said pin 20 by means of the coil spring 21. While one end of the coil spring 21 abuts the lower end of the cylindrical spring 19, the lower end of the coil spring rests on the cylinder 11. The spring 21 continuously urges the cylinder 11 away from the plunger 12.

Connected to the upper end of the plunger 12 is a tube 22 one end of which communicates with the interior of the hollow plunger 12 while the other end of the tube 22 has screwed thereon a fixture or nozzle 24 with a bore 23 therein.

The cylinder 11 has connected thereto on opposite sides thereof two hooks 25 and 26. Connected to these hooks are the ends of two steel wires 27 and 28, preferably rustproof, the other ends of which are connected to one end of a yoke 29, which in turn is attached to a preferably rustproof, steel wire 30 which passes through the upper end of the cane and has its upper end exposed so that it can be gripped by the hand holding the cane at its handle. The free end of the wire 30 is anchored in the handle 31 of the cane in any convenient manner, for instance, by attaching it to a knob 32 which closes the handle 31. The lower end of the cane is closed by a closure 33 which may be of rubber or any other convenient material.

As will be clear from the above, the hollow cane according to the present invention is completely closed, the passages 30a and 30b at the handle being just wide enough to allow the passage of wire 30 therethrough. Therefore, the entire cane constitutes a fluid reservoir which can easily be filled by merely turning the cane upside down, removing the closure or cap 33 and filling in the desired fluid. When the cane has been filled with fluid, the closure or cap 33 is replaced, whereupon the cane may be used for the desired purpose. To release the fluid from the cane it is only necessary to press on that portion of the wire 30 which is underneath the handle 31. As a result of this pressing action, the cylinder 11 will be moved upwardly so that the fluid in the cylinder 11 will be put under pressure which will force the ball 18 on the valve seat 15 while squeezing the fluid through the opening 23. As soon as the pressure on wire 30 is released, the coil spring 21 will return the cylinder 11 to its lower position, thereby allowing spring 17 to lift ball 18 off the valve seat 15. This action in turn allows fluid underneath the cylinder 11 to pass into the cylinder 11 and to fill up the cylinder again.

According to a further development of the invention, an attachment, generally designated 34, may be connected to the cane. This attachment comprises a trough-like or channel-shaped member 35 which may be clamped to the cane by means of a clamping ring 36 and screw 37. The member 35 carries a pipe or tube 38. The tube 38 communicates with a hose 39, the upper end of which is slipped over the nozzle 24.

The attachment 34 is particularly valuable when using the cane for eliminating weeds. It will be apparent that a slight pressure on the cane will cause the channel-shaped member 35 to dig into the ground near the roots of the weed to be eliminated, while a pressure on that portion of the wire 30 which is adjacent the handle 31 will cause the fluid in the pump 10 to pass through the nozzle 24 and tube 38 into the ground near the roots to be eliminated. It will furthermore be noted that the cane, together with the attachment 34 may also be used as a sprayer for spraying an insecticide on plants or bushes. In this instance it is merely necessary to point the cane to the plants or bushes to be treated and to actuate the pump 10 by pressing on the wire 30.

It is of course understood that the invention is by no means limited to the particular structure shown in the drawings but that it also embraces any modification within the scope of the appended claims.

Having thus fully described my invention, what I claim as new and desire to secure by Letters Patent, is:

1. In combination, a hollow cane provided with a curved cane-head and forming a reservoir adapted to be filled with a liquid, closure means detachably mounted on said cane to allow filling of said reservoir, a cylinder and plunger assembly within said reservoir including a stationary element and a movable element and also including spring means associated with said elements for continuously urging the same into a predetermined spaced relationship with regard to each other, said elements being hollow and slidably fitting one into another so as to form with each other a chamber of variable volume, conduit means communicating with said chamber and leading to the outside of said cane, nozzle means detachably connected to said conduit means at the outside thereof, valve means operable in response to the movement of said movable element in one direction to establish fluid connection between said reservoir and said chamber and to interrupt said communication in response to the movement of said movable element in the opposite direction to thereby allow ejection of fluid through said conduit means, and wire means operatively interconnecting said movable element with a fixed point on said cane-head, a portion of said wire means being exposed adjacent said hollow cane so as to be operable by the same hand holding said cane-head.

2. In combination, a substantially straight hollow cane provided with a curved cane-head and forming a reservoir adapted to be filled with a liquid, closure means detachably mounted on said cane to allow filling of said reservoir, a cylinder and plunger assembly within said reservoir including a stationary hollow member and a movable hollow member, said members slidably engaging each other and forming a chamber of variable volume, yielding means associated with said members and continuously urging the same to occupy a position of a predetermined maximum volume, wire means having one end connected to said movable member and extending through substantially the entire length of the straight portion of said cane, said wire means having its other end connected to the free end of said curved head and having a portion of said wire means exposed and extending underneath said curved head so as to be operable by the hand holding said curved head, stationary conduit means effecting communication between said chamber and the outside of said cane, said conduit means being provided with threaded means for receiving a nozzle, and valve means operatively connected with said reservoir and said chamber for effecting connection therebetween in response to the movement of said movable member in one direction, while interrupting said connection in response to the movement of said movable member in the opposite direction.

3. In combination, a hollow walking cane consisting of a hollow shank provided with a cane head projecting at one side of the shank at one end thereof, said shank forming a liquid reservoir adapted to be filled with a liquid, closure means detachably mounted on said shank at the opposite end thereof to provide for filling of the reservoir, a cylinder and plunger assembly positioned within said shank at the end thereof receiving said closure means and having a pumping chamber, said cylinder and plunger assembly including a spring holding the cylinder and plunger normally extended on a suction stroke, said assembly including a pressure closable valve connecting said pumping chamber with said reservoir and closable upon pumping operation of the assembly, a pipe means connected with said pumping chamber and projecting through the wall of said shank near the end thereof receiving said closure member, a nozzle detachably connected on the end of said pipe projecting through said shank wall, and a flexible wire means within said shank having one end thereof connected with the movable member of the assembly for operation thereof upon movement of said wire means and having the opposite end thereof projecting through the wall of said shank at said cane head with a portion thereof exposed at the cane head for actuation thereof by the fingers of the hand grasping the cane head.

TULLIE O. DICKENSHEETS.

REFERENCES CITED

The following references are of record in the file of this patent:

UNITED STATES PATENTS

| Number | Name | Date |
|---|---|---|
| 928,351 | Wilkenson | July 20, 1909 |
| 951,760 | Foulke et al. | Mar. 8, 1910 |
| 1,905,076 | Van Sciver | Apr. 25, 1933 |
| 2,177,792 | Taylor | Oct. 31, 1939 |
| 2,385,091 | Lukowitz | Sept. 18, 1945 |

FOREIGN PATENTS

| Number | Country | Date |
|---|---|---|
| 9,555 of 1892 | Great Britain | Aug. 13, 1892 |
| 95,618 | Germany | Mar. 12, 1897 |